2,925,322
Patented Feb. 16, 1960

2,925,322

METHOD OF SEPARATING PLUTONIUM

Henry George Heal, Montreal, Canada, assignor, by mesne assignments, to the United States of America as represented by the United States Atomic Energy Commission No Drawing. Application July 26, 1946
Serial No. 686,454

13 Claims. (Cl. 23—14.5)

This invention relates to a method of separating plutonium from relatively large amounts of uranium and fission products having high beta activity.

For example, the residual aqueous solutions obtained in processing pile irradiated uranium for the removal of a major portion of the uranium may serve as the starting materials in the present process. Such solutions contain substances, such as plutonium and uranium in the form of nitrates. In applications in the names of B. L. Goldschmidt, T. J. Hardwick and L. G. Cook there are described methods of separating plutonium, in residual nitrate solutions which contain some uranium, from large amounts of uranium and other elements by means of organic solvents. Such residual solutions may serve as starting materials in the present process.

It is an object of this invention to recover plutonium in practically pure compounds thereof from aqueous solutions containing the plutonium and other materials.

Broadly speaking, the invention contemplates the appropriate adjustment of the aqueous nitrate solutions which may be as mentioned above, whereby the plutonium may be carried down in a precipitate of ferric basic acetate or ferric hydroxide.

The aqueous solutions obtained as above mentioned may contain 10% or more of uranyl nitrate hexa hydrate, 0.5–1.5 N nitric acid, plutonium (IV) about 0.05 mg. per ml., and, in small amounts, B-active ruthenium and other materials. When triglycoldichloride is used in the extraction process, the aqueous solutions will contain up to 0.1 N HCl and are, of course, saturated with the organic solvent employed.

In accordance with the invention the pH of the aqueous solution is adjusted within a range of 3.0 to about 6.0 and a ferric salt is added to provide the vehicle for carrying down the plutonium IV. The preferred vehicle is ferric basic acetate but ferric hydroxide may be used. It should be stated that other acetates, like manganese and chromium, have been tried but they gave a recovery of plutonium of only 60% or less.

In accordance with the preferred form of the invention, adjustment of the solution is carried out by initially adding acetate ions thereto in the form of ammonium acetate and/or acetic acid. The pH of the solution is then further adjusted, if necessary, to 4.8 to 5.1 (glass electrode) by addition of ammonia or nitric acid. Thus, if the original concentration of nitric acid in the solution exceeds 0.5 N or thereabouts, ammonia is added but, if the nitric acid concentration is less than 0.5 N or thereabouts, nitric acid is added, to bring the solution to the required pH of 4.8 to 5.1. A pH of 4.8 to 5.0 is preferred. The precipitate becomes more bulky at a pH in excess of 5.1.

To the adjusted solution is added 0.2 mg. of iron per ml. of solution in the form of a concentrated solution of ferric nitrate. The addition of the ferric nitrate solution may result in a more acid solution thus causing a change in the pH, in which case the pH is adjusted with ammonia to 4.8 to 5.1. However, substantially neutral ferric nitrate may be employed, in which case further adjustment of the pH, following the initial adjustment, is not required.

The solution is then heated to 80–100° C., for an hour or longer, without boiling or stirring. Boiling and stirring tend to break up the precipitate which forms gradually and is initially in flocculent form and dark brown in colour. While the precipitate varies in composition depending upon variation of conditions, both ferric hydroxide and ferric acetate are present therein in varying ratios. The precipitate, in which the plutonium reports, may be removed by centrifugal action or filtration. A second (and third or more) precipitation, using the same amounts of ferric nitrate as before, may be carried out to recover additional amounts of plutonium. Alternatively, after formation of the first precipitate, the solution and precipitate therein may be cooled to 50–60° C., a similar amount of ferric nitrate added as before, and the temperature raised again to 80–100° C., without boiling or stirring, this procedure being repeated until the requisite scavenging of plutonium is obtained.

The precipitate obtained is dense and granular. It is washed preferably with a solution containing about 5% ammonium acetate and about 5% ammonium nitrate to remove entrained and adsorbed uranyl nitrate hexahydrate. The acetate and ammonium nitrate prevent peptizing of the precipitate. 2–5% of ammonium nitrate alone works but ammonium acetate alone does not work well. The uranium nitrate appears to form a soluble complex with the ammonium acetate, and the latter is employed in sufficient amount to form such complex. Furthermore, an amount of acetate above that required to complex the uranium results in a less bulky precipitate. Thus, when about 4% (i.e. 4 grams per 100 ml. of solution) of ammonium acetate plus that required to complex the uranium is employed, the bulk of the precipitate is reduced to substantially its minimum. For instance, with solutions containing up to 10% uranyl nitrate hexahydrate, 4% to 9% ammonium acetate should be added. When more uranium is present, more acetate will be required. The amount of ammonium acetate required to complex the compound as a soluble product is substantially one-half the weight of the uranyl nitrate hexahydrate. Unless the uranium is complexed, it will precipitate with the basic ferric acetate. Thus, with low or small additions of acetate which are insufficient to complex fully the uranium the pH at which uranium precipitates may be 3–4, but with larger amounts added, the pH at which uranium precipitates rises to 5.1–6.0. However, uranium precipitation is sluggish in cold or warm solutions, but occurs quickly in hot solutions.

The amount of plutonium carried down in the iron precipitate increases with increasing pH. When the concentration of plutonium is very low (tracer amounts) the scavenging of the solution by the ferric basic acetate of the plutonium rises sharply to above 90% in the range of pH of 3.0 to 3.5, and with further rise in pH the recovery does not change appreciably. However, when the plutonium concentration is higher, the pH must be adjusted upwardly by suitable additions if the recovery is to reach 90%. When the concentration is 0.05 mg. plutonium per ml., the recovery is practically 90% with a pH of 4.8–5.1. An increase in pH above 5.1 causes the precipitate to become more bulky, which is disadvantageous.

With tracer concentrations of plutonium, the percentage of it carried down increases rapidly as the iron concentration is raised up to substantially 0.2 mg. per ml., but from that point the percentage carried down increases quite slowly. Thus, little is gained by increasing the iron concentration over 0.2 mg. per ml., even with plutonium concentrations of 0.05 mg. per ml., since practically 90% is carried down with the ferric basic acetate precipitate in this case. Lower iron concentrations are not advisable since the amount of plutonium reporting in the ferric basic acetate precipitate then falls off rapidly.

*Example*

With a typical residual solution of the character mentioned of 160–200 litres of 1 N $HNO_3$ containing about 8 kilos of uranyl nitrate hexahydrate and 10 gms. of plutonium, 12 kilos of ammonium acetate are added and the pH adjusted. Three successive precipitations are carried out with centrifugal separation, using 40 gms. iron in each case. This gives a centrifuged precipitate having a total volume of about 1 litre when wet. The percentage of plutonium scavenged is >99.5%.

The uranium has no tendency to precipitate when conditions are correctly chosen and any uranium in the precipitate is adsorbed therein.

The residual B-activity, believed to be ruthenium, present in the water solution from the solvent extraction processes, is about 95% removed in the basic acetate precipitate in a practical procedure as outlined above. This is advantageous inasmuch as it is readily separated from the plutonium in the final stages of treatment, and the uranium solution is left inactive enough to be handled safely and disposed of without preliminary storage if desired.

The wet ferric acetate precipitate obtained, as in the example given above, contains about 12 times as much iron as plutonium by weight. This precipitate may be dissolved in dilute or concentrated nitric acid containing at least 0.2 N $HNO_3$ cold or, preferably, warm, the solution saturated with ammonium nitrate and extracted with nitromethane. The extract contains plutonium, a little uranium and a trace of iron, with only about 1% of the B-activity (which was originally about equal in strength to the $\alpha$-activity). The solvent may be re-extracted with water rendered, for example, 2 N in nitric acid to recover 98–99% of the plutonium, which is precipitated from the water solution free from uranium, iron and fission products by adding potassium iodate. The extraction may be repeated. If the volume is not increased unnecessarily at any stage, no concentration of the final water extract by evaporation is necessary. Nitromethane was found to be the best extractive solvent, although methylisobutylketone (hexone) ether and dipropylketone, among others, worked. The nitromethane was used in volume equal to that of the aqueous solution being extracted, although other proportions may be used. Using equal volumes and four extractions, 99.5% or more of the plutonium was recovered in the nitromethane.

Alternatively, the wet iron precipitate may be treated directly with concentrated hydrofluoric acid. This results in a solution of complex ferric fluoride, with a precipitate of $PuF_4$ which is substantially free of uranium, iron and fission products.

When using ferric hydroxide as the precipitating vehicle the concentration of the uranyl nitrate hexahydrate in the solution should not exceed 2.5% (2.5 gms. per 100 ml. of solution). A concentration of 1 to 2% or less is preferred. The solution should be hot and adjusted to a pH of 3.0 to 3.8 with ammonia or caustic. Under these conditions the uranium will not precipitate. Ferric nitrate, about 0.2 mg. per ml. and about neutral is added to the solution to effect precipitation. The plutonium comes down with the precipitate. This procedure has some disadvantages. The starting solutions need to be dilute and the ferric hydroxide precipitate is rather bulky.

It will be observed that the plutonium is in the IV valency state.

I claim:

1. A method of recovering plutonium IV and $\beta$-active ruthenium from aqueous nitrate solutions containing them, uranium, acetate ions and an organic solvent which comprises adjusting the pH of the solution to from 3.0 to 6.0, then adding a ferric salt to cause precipitation of a ferric compound carrying the plutonium IV and $\beta$-active ruthenium and heating the solution at substantially 80–100° C.

2. A method of recovering plutonium IV and $\beta$-active ruthenium from aqueous nitrate solutions containing them, uranium, acetate ions and an organic solvent which comprises adjusting the pH of the solution to from 4.8 to 5.1, by adding acetate ions thereto, then adding a ferric salt to cause precipitation of a basic ferric compound carrying the plutonium IV and $\beta$-active ruthenium and heating the solution at substantially 80–100° C.

3. A method of recovering plutonium IV and $\beta$-active ruthenium from aqueous nitrate solutions containing them, uranium and an organic solvent which comprises adjusting the pH of the solution to from 4.8 to 5.1, by initially adding acetate ions thereto and then by adding thereto one of a group consisting of ammonia and nitric acid, adding a ferric salt to cause precipitation of a basic ferric compound carrying the plutonium IV and $\beta$-active ruthenium and heating the solution at substantially 80–100° C.

4. A method as defined in claim 1, wherein the iron concentration in said solution is not substantially less than 0.2 mg. per ml.

5. A method as defined in claim 1 wherein the pH is adjusted by adding one of a group consisting of ammonium acetate and acetic acid.

6. A method of recovering plutonium IV from aqueous nitrate solutions containing the same and uranium and fission products which comprises adjusting the pH of the solution to from 4.8 to 5.1, by adding acetate ions thereto, then adding a ferric salt thereto, heating the solution to substantially 80–100° C., removing the resultant precipitate, and recovering plutonium IV therefrom.

7. A method of recovering plutonium IV from aqueous nitrate solutions containing the same and uranium and fission products which comprises adjusting the pH of the solution by adding acetate ions thereto, then adding ferric nitrate thereto, heating the solution to substantially 80–100° C., removing the resultant precipitate containing plutonium IV, washing the precipitate with a solution containing ammonium acetate and ammonium nitrate, and recovering plutonium IV therefrom.

8. A method as defined in claim 7 wherein the plutonium is recovered by dissolving the washed precipitate in nitric acid, saturating the resulting solution with ammonium nitrate, and treating the solution with nitromethane to produce an extract containing plutonium.

9. A method as defined in claim 7 wherein the plutonium is recovered by treating the washed precipitate with concentrated hydrofluoric acid.

10. A method as defined in claim 1 wherein the pH of the solution is adjusted to 3.0 to 3.8 and ferric nitrate is added to form ferric hydroxide as a vehicle to carry down plutonium.

11. A method of recovering plutonium IV from aqueous nitrate solutions containing it and uranyl nitrate hexahydrate in a concentration not in excess of 2.5 gms. per 100 ml. of solution which comprises adding ferric nitrate to the solution, adjusting the pH of the solution to 3.0–3.8 by the addition of ammonia to precipitate ferric hydroxide as a vehicle to carry down the plutonium IV and heating the solution at substantially 80–100° C.

12. A method of treating aqueous nitrate solutions containing uranium, plutonium IV and $\beta$-active ruthenium which comprises adding acetate ions to the solution, adjusting its pH to 4.8–5.1, adding ferric nitrate, maintaining the pH of the solution within the limits stated, heating the solution at 80–100° C. to form a scavenger precipitate containing basic ferric acetate to collect the plutonium and β-active ruthenium and separating the precipitate containing the basic ferric acetate, plutonium and ruthenium from the solution containing uranium.

13. In the separation of plutonium IV and β-active ruthenium from uranium in aqueous nitrate solutions the method which comprises adding ammonium acetate and ferric nitrate to the solution, maintaining the solution at a pH of 4.8–5.1, heating it at 80–100° C. to form a basic ferric precipitate to collect the plutonium and the ruthenium and separating the basic ferric precipitate, plutonium and ruthenium from the solution.

References Cited in the file of this patent

Harvey: "Nucleonics," vol. 2, No. 4, pages 30–40 (April 1948).